US00RE38580E1

(19) United States
(12) Reissued Patent
Hashimoto

(10) Patent Number: US RE38,580 E
(45) Date of Reissued Patent: Sep. 14, 2004

(54) CLUTCH OPERATING MECHANISM

(75) Inventor: Yasuyuki Hashimoto, Neyagawa (JP)

(73) Assignee: Exedy Corporation, Osaka (JP)

(21) Appl. No.: 09/707,769

(22) Filed: Nov. 8, 2000

Related U.S. Patent Documents

Reissue of:
(64) Patent No.: 5,833,041
Issued: Nov. 10, 1998
Appl. No.: 08/934,517
Filed: Sep. 22, 1997

U.S. Applications:
(63) Continuation of application No. 08/639,823, filed on Apr. 29, 1996, now abandoned.

(30) Foreign Application Priority Data

May 12, 1995 (JP) ..... 7-114951

(51) Int. Cl.[7] ..... F16D 13/02; F16D 25/08
(52) U.S. Cl. ..... 192/85 CA; 192/89.25; 192/99 A
(58) Field of Search ..... 192/85 CA, 70.3, 192/89.25, 89.24, 99 A, 91 A

(56) References Cited

U.S. PATENT DOCUMENTS

| | | | | | |
|---|---|---|---|---|---|
| 2,064,450 | A | * | 12/1936 | Spase | 192/99 A |
| 2,725,964 | A | * | 12/1955 | Maurer | 192/89.25 |
| 2,806,568 | A | * | 9/1957 | Bliss | 192/99 A |
| 3,237,739 | A | * | 3/1966 | Pritchard | |
| 3,306,407 | A | * | 2/1967 | Smirl | 192/99 A X |
| 3,412,834 | A | * | 11/1968 | Root | 192/85 CA |
| 3,417,844 | A | * | 12/1968 | Zeidler | 192/70.3 |
| 3,489,256 | A | * | 1/1970 | Binder et al. | 192/89.24 |
| 3,712,435 | A | * | 1/1973 | Kraus | 192/89.24 |
| 4,300,669 | A | * | 11/1981 | Browne | 192/89.25 |
| 4,601,376 | A | * | 7/1986 | Reik | |
| 4,635,779 | A | * | 1/1987 | Bacher et al. | |
| 4,680,847 | A | * | 7/1987 | Bauer | |
| 5,092,442 | A | * | 3/1992 | Takashi | 192/89.24 X |
| 5,103,953 | A | * | 4/1992 | Nakayama et al. | 192/99 A |
| 5,183,141 | A | * | 2/1993 | Abe et al. | 192/91 A |
| 5,205,387 | A | * | 4/1993 | Checa | 192/85 CA |
| 5,458,224 | A | * | 10/1995 | Takano | 192/85 CA |
| 5,695,036 | A | * | 12/1997 | Gochenour et al. | 192/89.24 X |

FOREIGN PATENT DOCUMENTS

| | | | |
|---|---|---|---|
| DE | 19958 | * | 4/1956 |
| DE | 30 24 196 | * | 1/1982 |
| DE | 30 43 861 | * | 8/1982 |
| DE | 35 06 349 | * | 8/1985 |
| DE | 34 23 499 | * | 1/1986 |
| EP | 0 185 176 | * | 6/1986 |
| FR | 1 398 339 | * | 3/1965 |
| FR | 2 536 141 | * | 5/1984 |
| FR | 2 546 592 | * | 11/1984 |
| FR | 2 554 190 | * | 5/1985 |
| GB | 689432 | * | 3/1953 |
| GB | 2 010 422 | * | 6/1979 |
| GB | 2 087 026 | * | 5/1982 |
| JP | 4-210127 | * | 7/1992 |

* cited by examiner

*Primary Examiner*—Rodney H. Bonck
(74) *Attorney, Agent, or Firm*—Shinjyu Global IP Counselors, LLP

(57) ABSTRACT

A clutch cover 25 is disposed opposite to a pressure surface 26a of a pressure plate 26 and is fixed to a flywheel. The pressure plate 26 has the pressure surface 26a facing a friction surface 15 of a clutch disk. An annular lever plate 28 is supported at its outer circumferential edge to a clutch cover 25 and is contacted at a radially intermediate portion to the pressure plate 26. The pressure plate 26 is biased to be disengaged from the friction surface 15 of the clutch disk. A release bearing 31 is in contact with an inner circumferential edge of the lever plate 28 on the transmission side. A hydraulic cylinder 32 serves to move the release bearing 31 in the axial direction.

18 Claims, 3 Drawing Sheets

CLUTCH OPERATING MECHANISM

Matter enclosed in heavy brackets [ ] appears in the original patent but forms no part of this reissue specification; matter printed in italics indicates the additions made by reissue.

The present application is a file wrapper continuation of Ser. No. 08/639,823, filed Apr. 29, 1996, now abandoned.

BACKGROUND OF THE INVENTION

A. Field of the Invention

The present invention relates to a clutch operating mechanism, and more particularly to a clutch operating mechanism used with a clutch disk, clutch cover and pressure plate, where the clutch operating mechanism produces force which urges the pressure plate into engagement with the clutch disk and a flywheel of an associated engine.

B. Description of Related Art

A conventional clutch mechanism usually includes a clutch disc, a clutch cover assembly and an actuating mechanism.

The clutch disc typically includes friction surfaces, a plate member that is coupled to and supports the friction surfaces and a spline hub elastically coupled to the plate member. Usually, the elastic coupling between the spline hub and the plate member includes a spring for dampening unwanted vibrations produced during the transmission of torque. An input shaft that extends from a transmission usually extends through the spline hub.

The clutch cover assembly usually includes a clutch cover connected to the flywheel of the engine, an annular pressure plate disposed within the clutch cover, and a diaphragm spring. The clutch cover and pressure plate confine and engage the clutch disk between the pressure plate and a flywheel.

The release mechanism is provided with a release bearing which engages an inner circumferential edge of the diaphragm spring. A drive mechanism connected to the release mechanism provides control for moving the release bearing in axial directions to move the diaphragm spring. In the case where the drive mechanism includes, for example, a hydraulic cylinder, the hydraulic cylinder is connected to a master cylinder. When a driver or operator manipulates a switch or lever, hydraulic fluid is forced from the master cylinder to the hydraulic cylinder. As a result, a piston within the hydraulic cylinder is moved in a predetermined axial direction so that the release bearing is also moved in the axial direction. The release bearing causes the inner circumferential edge of the diaphragm spring to move, so that the biasing force from the diaphragm spring to the pressure plate is released. As a result, the clutch is disengaged.

In the above-described clutch device, the movement of the piston works against the force or pressure from the diaphragm spring. As the diaphragm spring is moved, it is necessary to simultaneously control the load from the piston imparted to the release bearing that works against the force of the spring and control the distance the diaphragm spring moves. The distance the diaphragm spring is often referred to as the displacement of the diaphragm spring or stroke of the diaphragm spring. Since both force and stroke must be controlled, the structure of the control section is complicated, otherwise the reliability of the clutch control may be compromised. Also, since the spring characteristics of the diaphragm spring affect the pressure load, the reliability of the clutch control may be further compromised.

SUMMARY OF THE INVENTION

An object of the present invention is to enhance the reliability of a clutch control in a clutch device.

In accordance with a first aspect of the present invention, a clutch mechanism includes a clutch cover and an annular pressure plate disposed within the clutch cover and attached to a radially outward portion thereof for limited axial movement with respect to the clutch cover, the annular pressure plate having a pressure surface engageable with a friction face of a clutch disk. An annular lever plate is supported at an outer circumferential edge of the clutch cover, the annular lever plate being in contact with the annular pressure plate radially inward from the outer circumferential edge of the clutch cover. The annular pressure plate is biased away from engagement with the clutch disk.

Preferably, the clutch cover includes a plurality of strap plates attached to a radially outward portion thereof, the strap plates further connected to a radially outward portion of the annular pressure plate.

Preferably, the strap plates are configured to bias the annular pressure plate away from the clutch disk.

Preferably, the strap plates and the annular lever plate are both configured to bias the annular pressure plate away from the clutch disk.

Preferably, a bearing assembly is disposed adjacent to the annular pressure plate and supported about a transmission input shaft for axial movement along the input shaft, a portion of the bearing assembly configured to contact an inner circumferential edge of the lever plate. A hydraulic drive mechanism is connected to the bearing for effecting movement of the bearing.

Preferably, the lever plate is formed with a plurality of first slits extending radially inwardly from an outer circumferential edge thereof and a plurality of second slits extending radially outwardly from an inner circumferential edge thereof in an alternating manner.

Alternatively, a pneumatic drive mechanism may be employed for effecting movement of the bearing.

In accordance with another aspect of the present invention, the clutch mechanism includes a clutch cover having a plurality of strap plates attached to a radially outward portion thereof and an annular pressure plate disposed within the clutch cover and attached to the strap plate for limited axial movement with respect to the clutch cover, the annular pressure plate having a pressure surface engageable with a friction face of a clutch disk. An annular lever plate is supported at an outer circumferential edge of the clutch cover, the annular lever plate being in contact with the annular pressure plate radially inward from the outer circumferential edge of the clutch cover. The annular pressure plate is biased away from engagement with the clutch disk by the strap plates.

Preferably, the strap plates are configured to bias the annular pressure plate away from the clutch disk and the annular lever plate is formed with a plurality of first slits extending radially inwardly from an outer circumferential edge thereof and a plurality of second slits extending radially outwardly from an inner circumferential edge thereof in an alternating manner such that biasing effects of the annular lever plate are less than the strap plates.

Preferably, the strap plates and the annular lever plate are configured to bias the annular pressure plate away from the clutch disk.

In another aspect of the invention, a clutch mechanism includes a clutch cover having a plurality of strap plates attached to a radially outward portion thereof and an annular pressure plate disposed within the clutch cover and attached to the strap plate for limited axial movement with respect to the clutch cover, the annular pressure plate having a pressure surface engageable with a friction face of a clutch disk. An annular lever plate is supported at an outer circumferential edge of the clutch cover, the annular lever plate being in contact with the annular pressure plate radially inward from the outer circumferential edge of the clutch cover. The annular pressure plate is biased away from engagement with the clutch disk by the strap plates and the annular lever plate.

Preferably, the annular lever plate is formed with a plurality of first slits extending radially inwardly from an outer circumferential edge thereof and a plurality of second slits extending radially outwardly from an inner circumferential edge thereof in an alternating manner.

Preferably, the annular lever plate has a length $R_5$ measured from an inner circumferential edge to an outer circumferential edge thereof, the first slits have a radial length $R_3$ and the second slits have a radial length $R_4$ such that the radial lengths $R_3$ and $R_4$ are approximately 80% of the length $R_5$.

In the clutch mechanism according to the one aspect of the invention, when the bearing is moved toward the flywheel by the drive mechanism, the annular lever plate is deformed along the outer circumferential edge thereof as a fulcrum so that a radially intermediate portion thereof presses the pressure plate toward the flywheel. As a result, the pressure surface of the pressure plate causes the friction surface of the clutch disc to frictionally engage with the flywheel. In this case, a load which is several times larger than a load from the bearing to the inner circumferential edge of the diaphragm spring is applied to the pressure plate, corresponding to a ratio (lever ratio) of a length from the inner circumferential edge of the lever plate to the outer circumferential edge thereof to a length from the outer circumferential edge to the radially intermediate portion.

When the bearing returns to a position toward the transmission by release of fluid pressure by the drive mechanism, the force transmitted by the annular lever plate to the pressure plate is overcome by the force of the strap plates and thus, the clutch is disengaged.

In this clutch mechanism, a conventional diaphragm spring is not used for biasing the pressure plate. The pressure transmitted from the lever plate to the pressure plate is provided only by movement of the bearing against the inner circumferential edge of the annular lever plate. Thus, it is possible to control the clutch mechanism only by controlling the position of the bearing. The forces normally associated with a diaphragm spring are eliminated thus reducing the force required to operate the clutch mechanism. Further, the lever action of the annular lever mechanism multiplies the force from the bearing against the pressure plate, thus further reducing the force necessary to control engagement and disengagement of the clutch mechanism. Therefore, the reliability of the clutch control is enhanced.

In the clutch mechanism according to the present invention, since the first slits and second slits are formed in the lever plate, the lever plate has only the minimal rigidity.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE INVENTION

DESCRIPTION OF THE PREFERRED EMBODIMENTS

The present invention will now be described with reference to the accompanying drawings.

Figure 1:
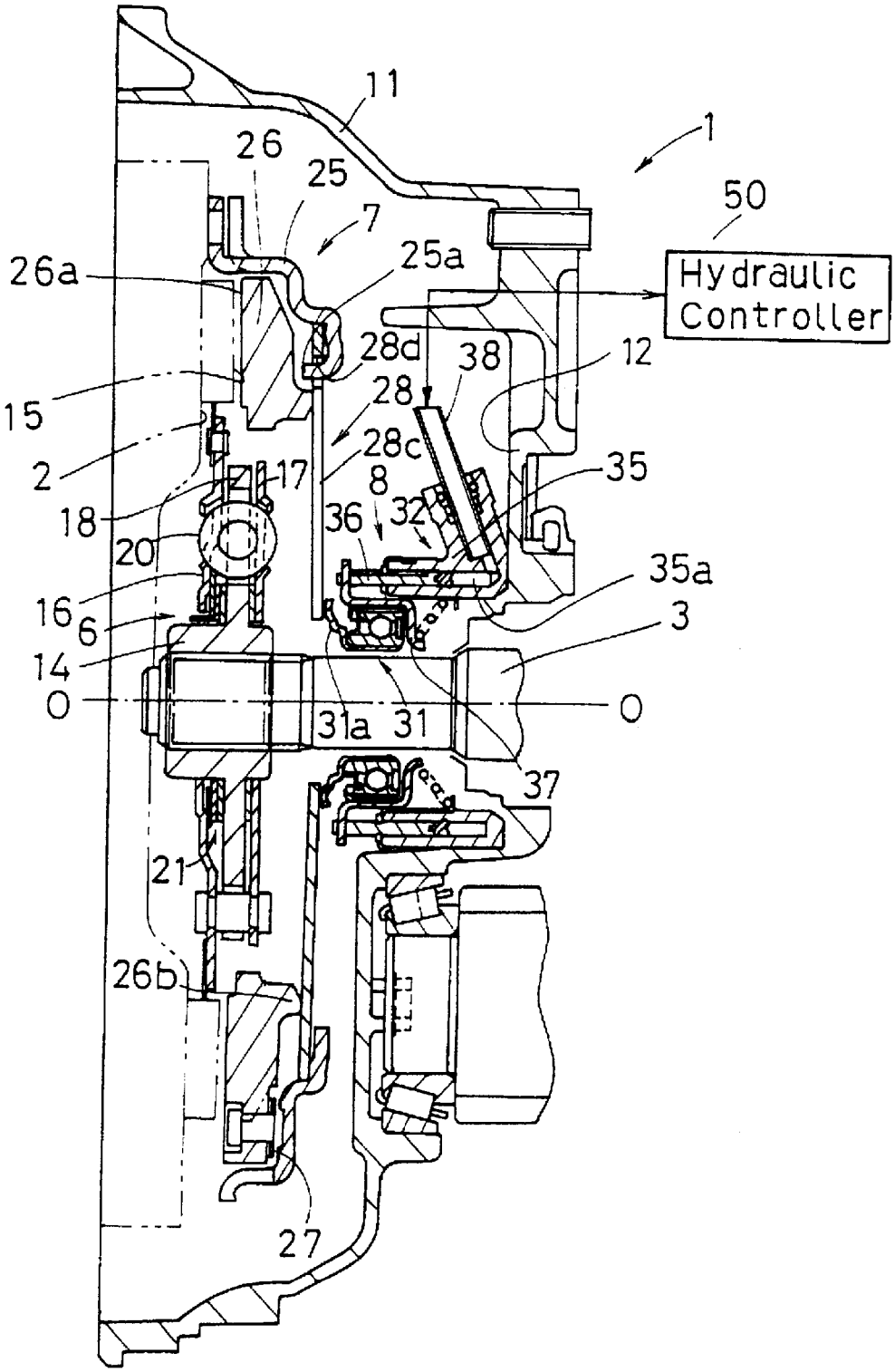
FIG. 1 is a schematic side cross-section view showing a clutch assembly having a clutch disk and a clutch disk actuation mechanism, in accordance with one embodiment of the present invention, with the clutch disk shown in a dis-engaged position.

A clutch assembly mechanism 1 is shown in FIG. 1 according to one embodiment of the present invention. In this clutch assembly mechanism 1, the line O—O denotes a rotary axis of the clutch assembly mechanism 1. The clutch assembly mechanism 1 serves to selectively transmit torque from a flywheel 2 to an input shaft 3 of a transmission (not shown, but disposed on the right side in FIG. 1). The clutch assembly mechanism 1 is mainly composed of a clutch disc assembly 6, a clutch cover assembly 7 and a hydraulic release device 8. The outer circumference of the clutch assembly mechanism 1 is covered by a housing 11. Also, a transmission housing 12 is disposed on the housing 11.

The disc assembly 6 is provided with friction surfaces 15 which are connected the radially outer circumferential sides of a clutch plate 16 and a retaining plate 17. The disc assembly 6 also includes a hub 14 having a flange 18 formed therewith, the flange 18 extending between the plates 16 and 17. A plurality of coil springs 20 elastically couple the flange 18 of the hub 14 with the plates 16 and 17 in a circumferential direction. A friction generating mechanism 21 is disposed between the plate 16 and the hub 14 for producing friction resistance in response to relative rotation between the hub 14 and the plates 16 and 17. The friction surfaces 15 are disposed adjacent to a frictional surface on the flywheel 2. The inner circumferential portion of the hub 14 is formed with spline gear teeth (not shown) which engage the main drive shaft 3.

The clutch cover assembly 7 is mainly composed of a clutch cover 25, a pressure plate 26, a plurality of strap plate 27 (although only one strap plate 27 is shown) and a lever plate 28. The clutch cover 25 is dish-shaped with a large hole in the central portion. The outer circumferential edge of the clutch cover 25 is fixed to the flywheel 2 by bolts (not shown). The pressure plate 26 is disposed within the clutch cover 25. As a result, a surface of the pressure plate 26 on the outer circumferential side is covered by the clutch cover 25. The pressure plate 26 has a pressure surface 26a facing the friction surfaces 15 of the clutch disc assembly 6. An annular projection 26b is formed on the inner circumferential side of the pressure plate 26 and extends toward the transmission.

The strap plates 27 couple the pressure plate 26 and the clutch cover 25 with each other at three spaced apart positions so that the pressure plate 26 and the clutch cover 25 are confined for rotation with each other. Further, the strap plates 27 bias the pressure plate 26 to pull away from the flywheel 2 such that in an unstressed state (where no force is applied by the hydraulic release device 8), the pressure plate 26 is maintained generally in the position shown in FIG. 1.

Figure 3:
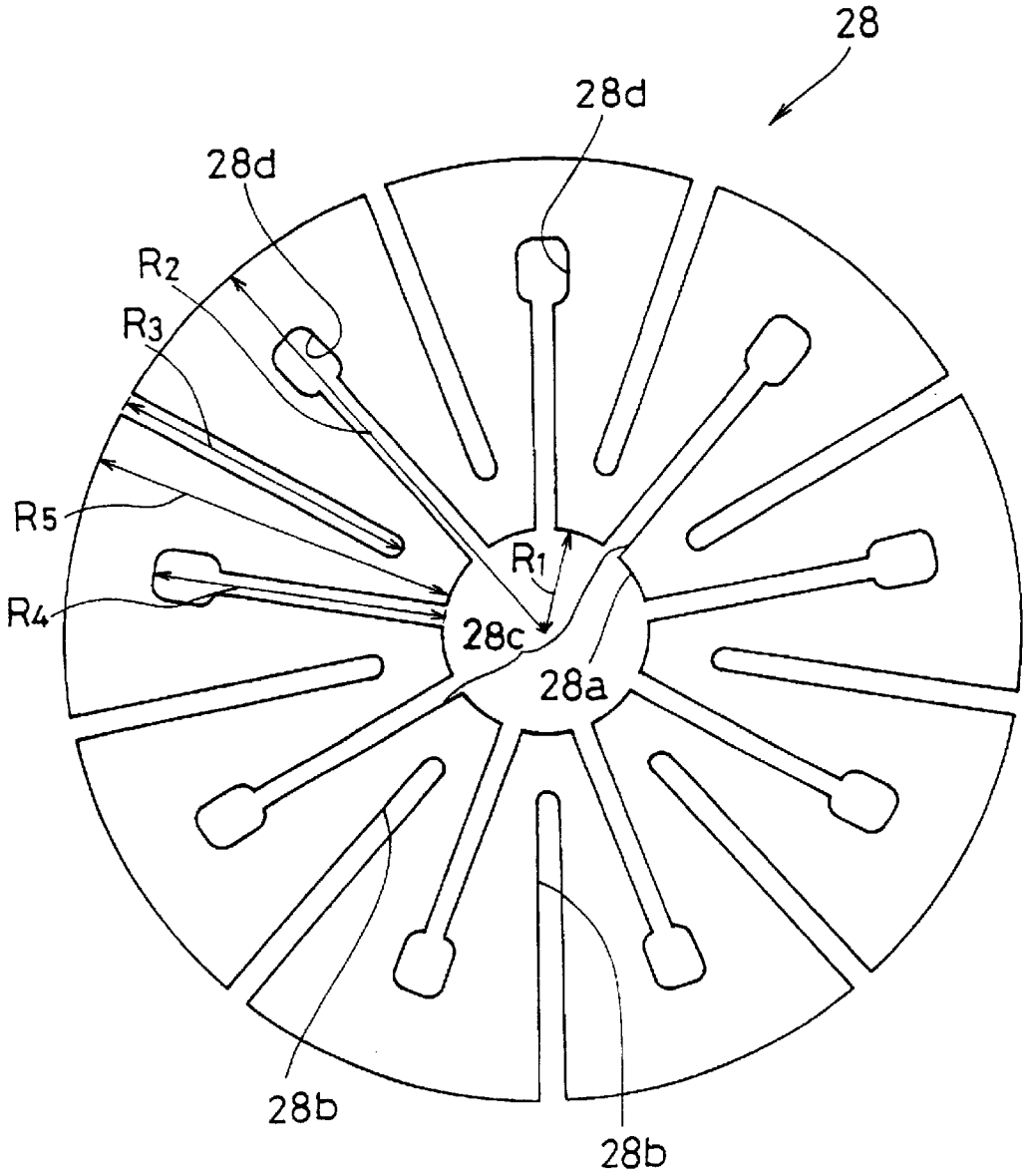
FIG. 3 is a plan view of a lever plate shown removed from the clutch assembly depicted in FIG. 1.

The lever plate 28 is made of an annular planar member having a central hole 28a as best shown in FIG. 3. The central hole 28a has a radius $R_1$. The lever plate 28 has an overall radius of $R_2$. A plurality of first slits 28b extending radially inwardly from the outer circumferential edge are formed in the lever plate 28 and have a radial length $R_3$. Furthermore, a plurality of second slits 28c are formed in the lever plate 28 and extend radially outwardly from the inner circumferential edge of the central hole 28a. The second slits 28c have a radial length $R_4$. The first slits 28b and the second slits 28c are alternately formed in an alternative manner in the circumferential direction in the lever plate 28. Due to the slits 28b and 28c, the lever plate 28 has a generally low level of rigidity. Further, the lever plate 28 has little biasing effect on the pressure plate 26.

Also, engagement holes 28d are formed at the outermost ends of the second slits 28c. Support portions 25a of the clutch cover 25 extend into the engagement holes 28d. With such an arrangement, the lever plate 28 rotates together with the clutch cover 25 as one-piece. The surface of the lever plate 28, on the transmission side, at the outer circumferential edge are in contact with the clutch cover 25. Furthermore, an intermediate portion of the lever plate 28 radially inward from the engagement holes 28d is in contact with the projection 26b of the pressure plate 26.

The hydraulic release device 8 is mainly composed of a release bearing 31 and a hydraulic cylinder 32. In the release bearing 31, a contact member 31a that engages an inner race thereof is in contact with the inner circumferential edge of the lever plate 28.

The hydraulic cylinder 32 is mainly composed of an annular housing 35, an annular piston 36, an annular carrier 37 and a hydraulic pressure supplying pipe 38. The annular housing 35 is fixed to the transmission housing 12 and is disposed coaxially with the rotary axis O—O of the clutch assembly mechanism 1. An annular oil chamber 35a extending axially about the input shaft 3 is formed in the annular housing 35. One end face of the oil chamber 35a is open toward the flywheel 2.

The annular piston 36 is disposed within the oil chamber 35a extending into the open end face of the oil chamber 35a. The annular carrier 37 is fixed to the distal end of the annular piston 36 and covers the outer circumferential portion of the release bearing 31. The annular carrier 37 is also connected to the outer race of the release bearing near to the transmission housing 12.

The hydraulic pressure supplying pipe 38 and an air bleeder pipe (not shown) are fixed to the annular housing 35 and are in communication with the oil chamber 35a. The hydraulic pressure supplying pipe 38 is connected to a hydraulic controller 50 having a master cylinder (not shown) and an actuation mechanism (not shown) for manipulating fluid pressure within the oil chamber 35a.

The operation of the invention will now be explained.

Figure 2:
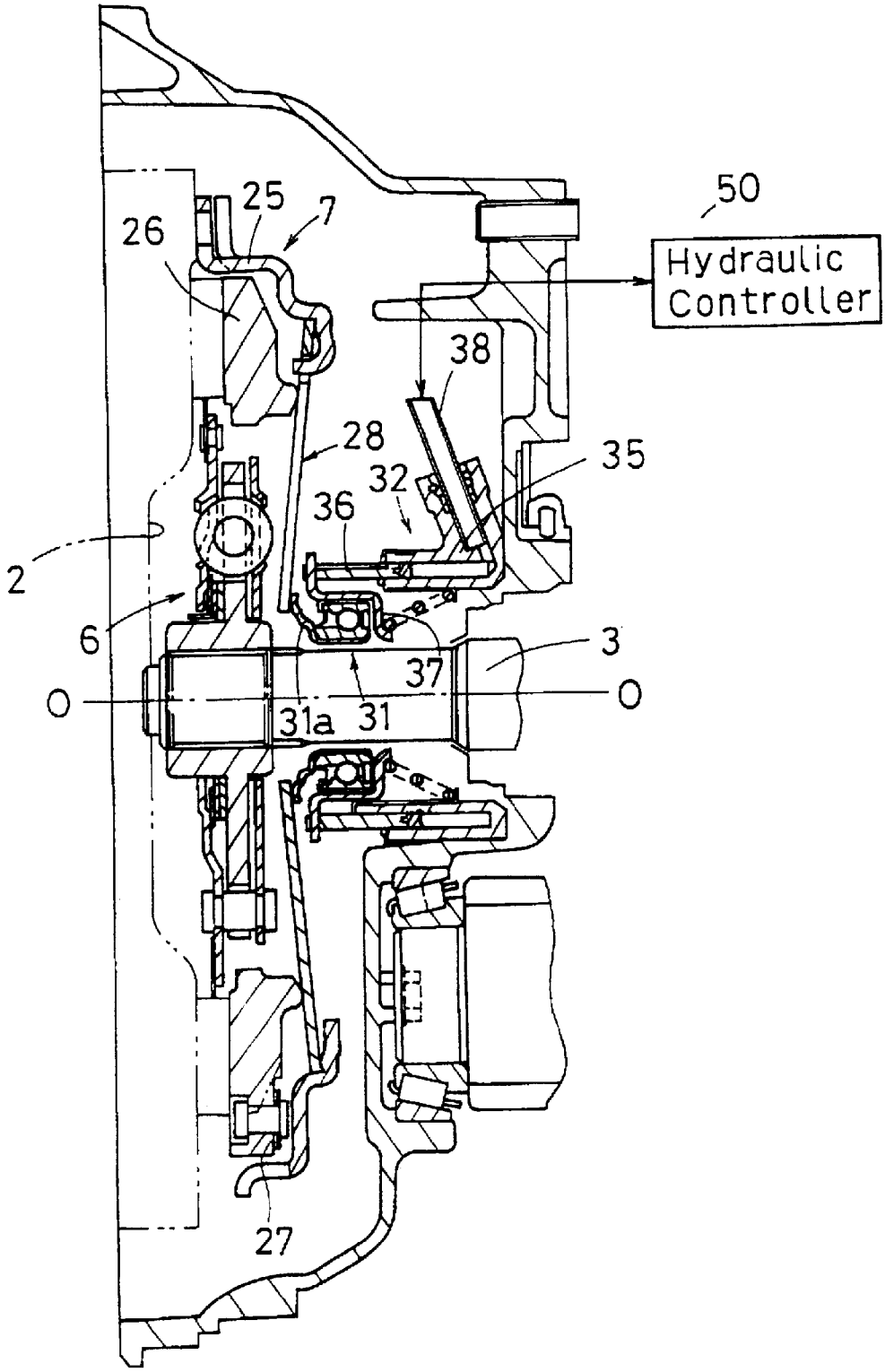
FIG. 2 is a schematic side cross-section view similar to FIG. 1, showing the clutch disk in an engaged position.

Clutch Engagement (FIG. 1 to FIG. 2)

When a driver or an operator wishes to engage the clutch assembly mechanism 1, the operator manipulates, for example, a switch or the lever associated to the hydraulic controller 50, to a clutch engagement position. In response, the hydraulic drive device 50 causes a predetermined pressure of hydraulic fluid to be fed from the hydraulic drive device 50 through the hydraulic pressure supplying pipe 38 to the oil chamber 35a of the hydraulic cylinder 32. As a result, the annular piston 36 is moved toward the flywheel 2, and simultaneously therewith, the release bearing 31 is moved from the position shown in FIG. 1 to the position shown in FIG. 2. In this case, the release bearing 31 imparts a load or force to the inner circumferential edge of the annular lever plate 28 such that the position of the lever plate 28 is changed. Because of lever action, a load from the movement of the release bearing 31 is multiplied several times by the lever plate 28 and the multiplied load is applied to the pressure plate 26. The pressure surface 26a of the pressure plate 26 causes the friction surface 15 to be engaged with the flywheel 2. As a result, the torque from the flywheel is transmitted to the clutch disc assembly 6 and is output to the main drive shaft 3.

Incomplete Clutch Engagement

When a driver or an operator wishes to partially engage the clutch assembly mechanism 1, the operator manipulates, for example, the switch or the lever associated to the hydraulic controller 50, to an incomplete clutch engagement position. In response, the hydraulic drive device 50 causes a predetermined pressure of hydraulic fluid to be fed from the hydraulic drive device 50 through the hydraulic pressure supplying pipe 38 to the oil chamber 35a of the hydraulic cylinder 32. In the hydraulic cylinder 32, a hydraulic pressure by which the annular piston 36 is pressed on the engine side may be reduced within the oil chamber 35a. As a result, the load given from the release bearing 31 to the lever plate 28 is reduced from the load in the above-described clutch engagement state, so that the pressure load to the pressure plate 26 is reduced. Thus, the clutch is kept in the incomplete clutch engagement and may slip.

Clutch Disengagement (FIG. 2 to FIG. 1)

When a driver or an operator wishes to dis-engage the clutch assembly mechanism 1, the operator manipulates, a switch or the lever associated to the hydraulic controller 50, to a clutch dis-engagement position. In response, the hydraulic drive device 50 causes hydraulic fluid to be drained from the hydraulic drive device 50 through the hydraulic pressure supplying pipe 38 from the oil chamber 35a of the hydraulic cylinder 32. As a result, the load given from the lever plate 28 to the pressure plate 26 is eliminated. In this case, the pressure plate 26 is moved toward the transmission by the biasing force from the strap plates 27. Consequently, the friction surfaces 15 of the clutch disc assembly 6 separate away from the flywheel 2 and the pressure plate 26 to dis-engage the clutch.

In the above-described clutch operation, a conventional diaphragm spring is not used for imparting the pressure load to the pressure plate 26. Namely, the pressure transmitted to the pressure plate 26 urging it toward the flywheel 2 comes from the movement of the release bearing 31, not from any biasing from the lever plate 28. Movement of the release bearing 31 is controlled by the fluid pressure within the chamber 35a. Thus, to control the clutch pressure load, since it is sufficient to control the load only from the release bearing 31 to the lever plate 28, the reliability of the clutch control is enhanced.

Also, since the first slits 28b and the second slits 28c are formed in the lever plate 28, the lever plate 28 has minimal rigidity as a lever. As a result, the reliability of the clutch control is improved.

It should be appreciated that the lever plate 28 and the slits 28b and 28c may formed therein may be dimensioned to provide the lever plate 28 with sufficient biasing force to assist the strap plates 27 in biasing the pressure plate 26 away from the friction surface 15. Alternatively, the lever plate 28 and the slits 28b and 28c may be configured to provide little or no biasing force whatsoever. Further, the lever plate 28 and the slits 28b and 28c may be configured to slightly counteract the biasing force of the strap plates 27 so that the pressure plate 26 biased away from the friction surface 15 by a minimal amount of force thus reducing the load necessary from the hydraulic controller 100 to engage the pressure plate 26 with the friction surface 15. Determination of the biasing effects of the strap plates 27 and the lever plate 28 are determined by application of the clutch assembly 1 and the usage thereof. Changes in the biasing effects of the lever plate 28 may be made by, for instance, changing the dimensions of the radii $R_3$ and $R_4$. In the embodiment shown in FIG. 3, the radii $R_3$ and $R_4$ are about 80% of the length $R_5$ of the lever plate 28. However, regardless of the biasing effects of the strap plate 27 and the lever plate 28, the pressure plate 26 is biased away from engagement with the friction surface 15.

As another embodiment, it is possible to use a pneumatic drive device instead of the hydraulic drive device 50. The other structure is the same as that described above.

Since the first slits and the second slits are formed in the lever plate, the lever plate has minimal rigidity, which reduces possible affects to the pressure load.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A clutch mechanism comprising:

a clutch cover;

an annular pressure plate disposed within said clutch cover and attached to said clutch cover for limited axial movement with respect to said clutch cover, said annular pressure plate having a pressure surface engagable with a friction face of a clutch disk;

an annular lever plate having an outer circumferential edge engaging a portion of said clutch cover, said annular lever plate being in contact with said annular pressure plate radially inward from said outer circumferential edge;

a plurality of strap plates attached to a radially outward portion of said clutch cover, said strap plates further connected to a radially outward portion of said annular pressure plate, and said strap plates are configured to bias said annular pressure plate away from the clutch disk;

a bearing assembly disposed adjacent to said annular lever plate and supported about a transmission input shaft for axial movement along said input shaft, a portion of said bearing assembly configured to contact an inner circumferential edge of said lever plate; and wherein said lever plate is formed with a plurality of first slits extending radially inwardly from an outer circumferential edge thereof and a plurality of second slits extending radially outwardly from an inner circumferential edge thereof in an alternating manner and said annular lever plate has generally no biasing effect on said annular pressure plate, and wherein each of said plurality of second slits of said lever plate is further formed with engagement holes at a terminus thereof, and said clutch cover is formed with a plurality of support portions, said support portions being bent to extend in an axial direction such that said support portions extend through corresponding ones of said engagement holes.

2. The clutch mechanism as in claim 1 wherein said annular lever plate has a length $R_5$ measured from an inner circumferential edge to an outer circumferential edge thereof, said first slits have a radial length $R_3$ and said second slits have a radial length $R_4$ such that the radial lengths $R_3$ and $R_4$ are approximately 80% of the length $R_5$.

3. The clutch mechanism as in claim 1 further comprising a hydraulic drive mechanism for effecting movement of said bearing.

4. The clutch mechanism as in claim 1 further comprising a pneumatic drive mechanism for effecting movement of said bearing.

*5. The clutch mechanism according to claim 1, wherein*

*said support portions extending axially through said engagement holes are arranged radially inward of said outer circumferential edge of said lever plate and radially outward of an intermediate portion of said lever plate, said intermediate portion contacting said pressure plate.*

*6. The clutch mechanism according to claim 5, wherein*

*said annular lever plate has a central hole.*

*7. The clutch mechanism according to claim 6, wherein*

*said first slits arranged in an alternating manner with said second slits extending radially outward from said inner circumferential edge of said lever plate.*

*8. The clutch mechanism according to claim 6, wherein*

*said annular lever plate has a length $R_5$ measured from said inner circumferential edge to said outer circumferential edge and each of said second slits have a length $R_4$, length $R_4$ being approximately 80% of length $R_5$.*

*9. The clutch mechanism according to claim 1, wherein*

*said annular lever plate has a central hole.*

*10. A clutch mechanism comprising:*

*a clutch cover, said clutch cover being formed with a plurality of support portions;*

*an annular pressure plate disposed within said clutch cover and attached to said clutch cover for limited axial movement with respect to said clutch cover, said annular pressure plate having a pressure surface engageable with a friction face of a clutch disk;*

*an annular lever plate having an outer circumferential edge engaging a portion of said clutch cover and being in contact with said annular pressure plate radially inward from said outer circumferential edge, said lever plate being formed with a plurality of slits, each of said plurality of slits of said lever plate being further formed with engagement holes at a terminus thereof, said support portions being bent to extend in an axial direction such that said support portions extend through corresponding ones of said engagement holes, said annular lever plate having generally no biasing effect on said annular pressure plate;*

*a plate member attached to said clutch cover, said plate member further connected to said annular pressure plate, said plate member being configured to bias said annular pressure plate away from the clutch disk;*

*a bearing assembly disposed adjacent said annular lever plate and adapted to be supported about a transmission input shaft for axial movement along the input shaft, a portion of said bearing assembly configured to contact said lever plate; and*

*a controller arranged to apply selectively a load in an axial direction toward said annular pressure plate to an inner circumferential edge of said lever plate such that said lever plate moves said pressure plate toward the clutch disk when the load is applied and said pressure*

*plate moves away from the clutch disk when the load is removed, said pressure plate arranged to move away from the clutch disk by said plate member.*

*11. The clutch mechanism according to claim 10, further comprising*

*a hydraulic drive mechanism arranged to move said bearing assembly.*

*12. The clutch mechanism according to claim 10, further comprising*

*a pneumatic drive mechanism arranged to move said bearing assembly.*

*13. A clutch mechanism comprising:*

*a clutch cover;*

*an annular pressure plate disposed within said clutch cover and attached to said clutch cover for limited axial movement with respect to said clutch cover, said annular pressure plate having a pressure surface engageable with a friction face of a clutch disk;*

*an annular lever plate having an outer circumferential edge arranged to engage a portion of said clutch cover and arranged to contact said annular pressure plate radially inward from said outer circumferential edge, said lever plate being formed with a plurality of slits, each of said plurality of slits of said lever plate being further formed with engagement holes at a terminus thereof, and said clutch cover being formed with a plurality of support portions, said support portions arranged to extend in an axial direction such that said support portions extend through corresponding ones of said engagement holes, said annular lever plate having generally no biasing effect on said annular pressure plate;*

*a plate number arranged to move said pressure plate away from the clutch disk when a force applied to said pressure plate from said lever plate is eliminated; and*

*a controller arranged to selectively apply a load in an axial direction toward said annular pressure plate to an inner circumferential edge of said lever plate such that said lever plate moves said pressure plate toward the clutch disk when the load is applied and said pressure plate moves away from the clutch disk when the load is removed, said pressure plate arranged to move away from the clutch disk by said plate member.*

*14. The clutch mechanism according to claim 13, wherein*

*said support portions extending axially through said engagement holes are arranged radially inward of said outer circumferential edge of said lever plate and radially outward of an intermediate portion of said lever plate, said intermediate portion contacting said pressure plate.*

*15. The clutch mechanism according to claim 14, wherein*

*said annular lever plate has a central hole and said slits extend radially outward from an inner circumferential edge of said lever plate.*

*16. The clutch mechanism according to claim 15, wherein*

*said annular lever plate has a length $R_5$ measured from said inner circumferential edge to said outer circumferential edge and each of said slits have a length $R_4$, length $R_4$ being approximately 80% of length $R_5$.*

*17. The clutch mechanism according to claim 13, wherein*

*said annular lever plate has a central hole and said slits extend radially outward from an inner circumferential edge of said lever plate.*

*18. A clutch mechanism comprising:*

*a clutch cover;*

*an annular pressure plate disposed within said clutch cover and attached to said clutch cover for limited axial movement with respect to said clutch cover, said annular pressure plate having a pressure surface engageable with a friction face of a clutch disk;*

*an annular lever plate having a central hole, said annular lever plate having an outer circumferential edge arranged to engage a portion of said clutch cover and arranged to contact said annular pressure plate radially inward from said outer circumferential edge, said lever plate being formed with a plurality of slits, said plurality of slits extending radially outward from an inner circumferential edge of said lever plate, each of said plurality of slits of said lever plate being further formed with engagement holes at a terminus thereof, and said clutch cover being formed with a plurality of support portions, said support portions arranged to extend in an axial direction such that said support portions extend through corresponding ones of said engagement holes, said support portions being arranged radially inward of said outer circumferential edge of said lever plate and radially outward of an intermediate portion of said lever plate, said intermediate portion contacting said pressure plate, said annular lever plate having a plurality of outer slits extending radially inward from said outer circumferential edge of said lever plate, said outer slits arranged in an alternating manner with said slits extending radially outward from said inner circumferential edge of said lever plate, said annular lever plate having generally no biasing effect on said annular pressure plate;*

*a plate member arranged to move said pressure plate away from the clutch disk when a force applied to said pressure plate from said lever plate is eliminated; and*

*a controller arranged to selectively apply a load to an inner circumferential edge of said lever plate such that said lever plate moves said pressure plate toward the clutch disk when the load is applied and said pressure plate moves away from the clutch disk when the load is removed, said pressure plate arranged to move away from the clutch disk by said plate member.*

* * * * *